May 15, 1923.
L. LYNDON
VENT PLUG FOR STORAGE BATTERIES
Filed Sept. 7, 1921
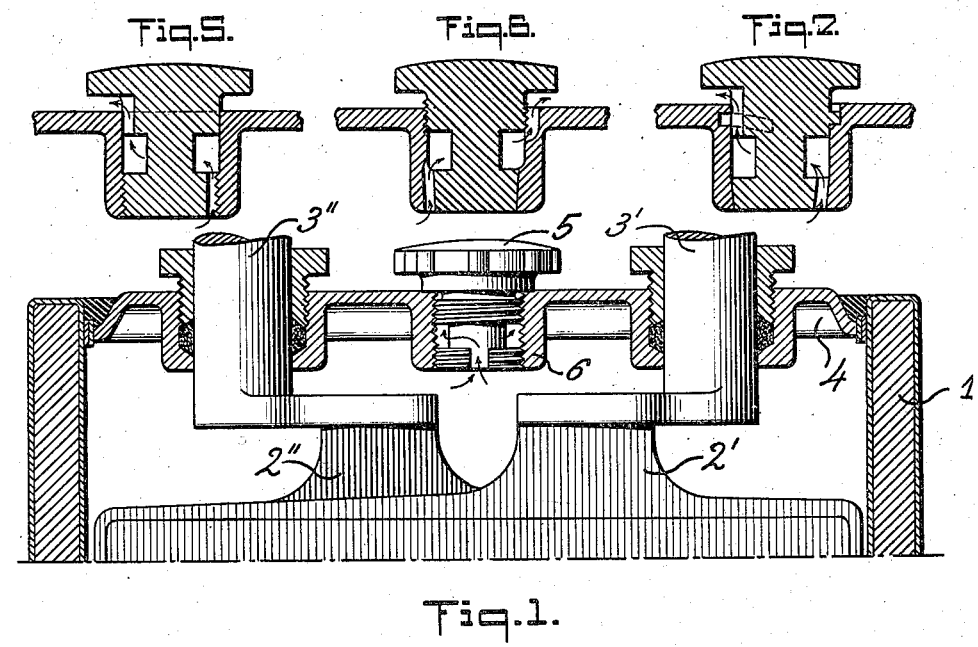
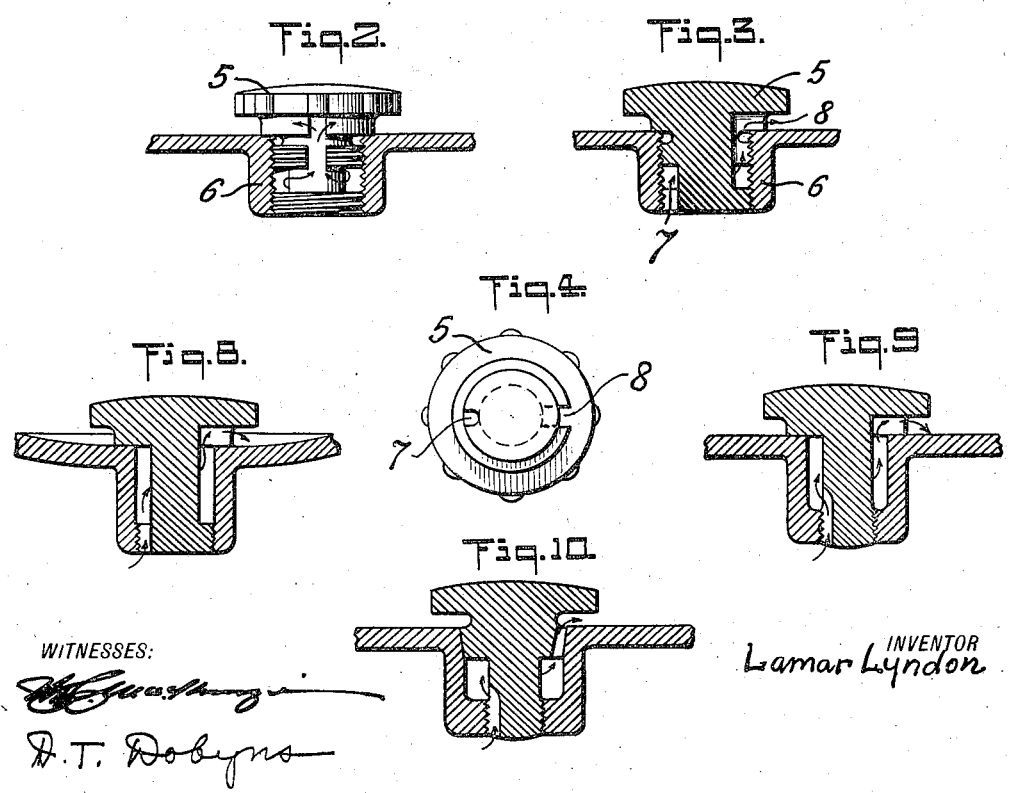
WITNESSES:
INVENTOR
Lamar Lyndon Patented May 15, 1923.

1,455,344

UNITED STATES PATENT OFFICE.

LAMAR LYNDON, OF NEW YORK, N. Y.

VENT PLUG FOR STORAGE BATTERIES.

Application filed September 7, 1921. Serial No. 499,052.

*To all whom it may concern:*

Be it known that I, LAMAR LYNDON, a citizen of the United States, and resident of New York, in the county and State of New York, have invented certain new and useful Improvements in Vent Plugs for Storage Batteries, of which the following is a specification.

My invention relates to a new and improved vent plug for enclosed secondary or storage batteries.

As is well known, the means for egress of gases from an enclosed storage battery must be so devised that the entrained electrolyte is deposited before the gases escape into the open air. The escaping gases should be as nearly dry as possible, not only because residual moisture would constitute a continuous loss of electrolyte, but also because this moisture, if deposited on the outside of the cell, is liable to cause short circuits. The desired conditions are not entirely met in the commercial batteries of today wherein the gases, after entering an expansion chamber, are allowed to escape through vent holes drilled in the filler plug. Drilling of holes, moreover, and internal moulding required in the manufacture of existing vent plugs, constitute a comparatively expensive process. My invention provides means for accomplishing the desired results which are not only an improvement from an operating standpoint, but from the standpoint of simplicity and cheapness, also. My vent plug is solid, in the sense that no drilling of holes and no internal moulding are required in my invention. At the same time, my invention provides means whereby whatever moisture may have escaped from the cell is allowed to drain back into the cell. Another important feature of my invention is that any electrolyte that may have been spilled while filling the battery will, also, flow into the cell. Other novel and useful features will appear from the detailed description of my invention.

Referring to the accompanying drawings:

Figure 1 is a vertical cross section of the upper part of an enclosed storage battery cell. Figures 2 and 3 are, respectively, a partial and a complete cross section of the vent plug shown in Figure 1. Figure 4 is a bottom view of this vent plug. The remaining Figures, 5 to 10, are cross sections of other forms of my invention.

Referring particularly to Figure 1, 1 is a containing cell; 2' and 2" are lugs of a pair of plates, one positive and the other negative; 3' and 3" are portions of the corresponding terminal ports; 4 is the cover of the cell sealed to the containing jar in the usual manner; 5 is the solid vent or filler plug. The portion of the solid vent plug which fits into the filler opening is threaded at its upper and lower ends, leaving an unthreaded portion of smaller diameter in between. The space between the said unthreaded portion of the plug and the filler opening of the cell cover forms an expansion chamber for the escaping gases. The internal surface of the boss 6, which is a part of the cell cover 4, is threaded to receive the solid vent plug. The threads of the solid plug are broken at diametrically opposite sides, as is clearly seen in Figure 3, forming grooves for the passage of the gases which enter from the cell at 7 and escape into the open air at 8, and whose course is indicated by arrows in the several figures.

Various modifications may be made in the design of my invention without changing its general principle. In Figure 5, only the lower end of the solid plug is threaded. In Figure 6, only the upper part of the portion of the solid plug which fits into the filler opening is threaded, while the grooves are made in the boss of the cell cover instead of in the vent plug. In Figure 7, a bayonet joint replaces the thread. In Figure 8, the expansion chamber extends all the way to the solid plug cap. In Figure 9, this expansion chamber is cut out of the boss. Finally, in Figure 10, a different mode of exit for the gases is indicated.

It will be noted that the opening for the final exit of gases is flush with the upper surface of the cell cover. To facilitate the draining of moisture into the cell, the surface of the cover may be made sloping towards the filler opening, as indicated in Figure 8.

Having duly described my invention, I claim:

1. In an enclosed storage battery having a filler opening, venting means, including a solid vent plug and an expansion chamber between the surface of said filler opening and said vent plug.

2. In an enclosed storage battery, venting means, including a solid vent plug and an expansion chamber surrounding a portion of said plug.

3. In an enclosed storage battery having a filler opening, a solid vent plug, a portion of said plug having a diameter smaller than the diameter of said filler opening.

4. In an enclosed storage battery having a filler opening, venting means including a vent plug and a passage way for gases into the open air, said passage way being formed between the surface of said filler opening and said vent plug.

5. In an enclosed storage battery, venting means comprising a solid vent plug, an expansion chamber and two openings.

6. In a storage battery having a cover and a filler hole in said cover, venting means comprising a vent plug, an expansion chamber, an opening into said chamber and another opening therefrom, said chamber and said two openings being formed between the surfaces of said cover and filler hole, and said vent plug.

7. In a storage battery, venting means including a vent plug and two openings, said openings being formed by grooves in said plug.

8. In an enclosed storage battery having a filler hole, a solid vent plug, a portion of said plug having the same diameter as said filler hole, and another portion having a diameter smaller than the diameter of said filler hole, and grooves in that portion of said vent plug which has the same diameter as the filler hole.

9. In an enclosed storage battery having a filler opening, a filler plug, removably fitted into said opening, and venting means disposed between said plug and the surface of said opening, said opening being flush with the external surface of the battery cover.

10. In a storage battery, the combination with a cell cover having a depressed portion, of a filler opening in said depressed portion, and a solid vent plug removably fitted into said opening.

11. In a storage battery cover having a threaded opening, a solid vent plug having a correspondingly threaded portion adapted to be received by said cover opening, and a groove in the threaded portion of said plug.

12. In a cover for storage battery cells having a threaded opening, a solid vent plug, a portion of which is threaded and adapted to be received by said threaded cover opening, an expansion chamber between an unthreaded portion of said plug and said cover opening, passage ways for the entry of gases into, and exit from, said chamber, and an opening flush with the external surface of said cover for the exit of said gases into the open air.

13. In a storage battery, the combination with a cell cover having a depressed portion, of a filler opening in said depressed portion, a filler plug, and venting means disposed between said plug and the surface of said opening.

New York, September 6th, 1921.

LAMAR LYNDON.